US008325689B2

(12) United States Patent
Kuskin

(10) Patent No.: US 8,325,689 B2
(45) Date of Patent: Dec. 4, 2012

(54) EFFICIENT DATA TRANSMISSION BY DATA AGGREGATION

(75) Inventor: Jeffrey S. Kuskin, Mountain View, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 587 days.

(21) Appl. No.: 12/272,603

(22) Filed: Nov. 17, 2008

(65) Prior Publication Data

US 2009/0073930 A1  Mar. 19, 2009

Related U.S. Application Data

(63) Continuation of application No. 10/934,869, filed on Sep. 3, 2004, now Pat. No. 7,463,611.

(60) Provisional application No. 60/588,537, filed on Jul. 15, 2004.

(51) Int. Cl.
*H04W 4/00* (2009.01)
*H04J 3/24* (2006.01)

(52) U.S. Cl. .................. 370/338; 370/349; 370/474

(58) Field of Classification Search .................. None
See application file for complete search history.

(56) References Cited

U.S. PATENT DOCUMENTS

| 6,266,343 | B1 | 7/2001 | Caves |
| 6,459,687 | B1 | 10/2002 | Bourlas et al. |
| 6,657,568 | B1 | 12/2003 | Coelho et al. |
| 6,674,737 | B1 | 1/2004 | Baker |
| 6,683,866 | B1 | 1/2004 | Stanwood et al. |
| 6,694,430 | B1 | 2/2004 | Zegelin et al. |
| 7,280,518 | B2 * | 10/2007 | Montano et al. ............. 370/338 |
| 7,463,600 | B2 * | 12/2008 | Tong et al. .................. 370/314 |
| 7,701,975 | B1 * | 4/2010 | Tsang et al. ................ 370/474 |
| 2003/0063619 | A1 * | 4/2003 | Montano et al. ............. 370/443 |
| 2003/0214928 | A1 | 11/2003 | Chuah |
| 2004/0179475 | A1 | 9/2004 | Hwang et al. |
| 2005/0015703 | A1 | 1/2005 | Terry et al. |
| 2005/0021864 | A1 | 1/2005 | Sherman et al. |
| 2005/0030965 | A1 | 2/2005 | Aoki et al. |
| 2007/0002806 | A1 | 1/2007 | Soomro |

OTHER PUBLICATIONS

International Search Report and Written Opinion—PCT/US2005/021999, ISA/US, May 12, 2006.

* cited by examiner

*Primary Examiner* — Chi Pham
*Assistant Examiner* — Soon-Dong D Hyun
(74) *Attorney, Agent, or Firm* — Bever, Hoffman & Harms, LLP

(57) ABSTRACT

To efficiently transmit data on a wireless network, small packets that might otherwise be sent individually are aggregated into a "superframe". This superframe can then be transmitted as a single, larger packet. To form this superframe, a plurality of tagged data packets can be aggregated into a packed aggregation block (PAB). Encapsulation data, e.g. protocol information, can be appended to the PAB. Wireless transmission information can bound the PAB and encapsulation data. Forming the superframe can be performed using an efficient combination of hardware and software. In one embodiment, aggregation of the tagged data packets can be performed by hardware without regard to the underlying protocol(s). Software can then provide protocol-handling support.

19 Claims, 3 Drawing Sheets

EFFICIENT DATA TRANSMISSION BY DATA AGGREGATION

RELATED APPLICATIONS

This application is a continuation of U.S. patent application Ser. No. 10/934,869, entitled "Efficient Data Transmission By Data Aggregation" filed Sep. 3, 2004 which claims priority of U.S. Provisional Patent Application 60/588,537, entitled "Efficient Data Transmission By Data Aggregation" filed Jul. 15, 2004.

BACKGROUND OF THE INVENTION

1. Field of the Invention The present invention relates to the transmission of data over a wireless network and, more particularly, to transmission of aggregated data packets.

2. Description of the Related Art

In wireless network communication, data communication is often performed by sending one or more streams of data packets. Typically, each communication packet will include overhead. This overhead can include protocol information, e.g. source and destination addressing, size, and data integrity check values. As the number of packets increases, overhead can become a significant burden.

One wireless network contention protocol, called Carrier Sense Multiple Access (CSMA), listens to a network to avoid collisions. Specifically, before any data is transmitted, CSMA broadcasts a signal to the network to listen for possible collisions and cautions other devices to refrain from broadcasting. Unfortunately, in networks that employ CSMA, detecting a clear channel further adds to the effective overhead of data transmission and is especially wasteful if many small packets are transmitted.

Therefore, a need arises for an efficient means of transmitting data on a wireless network.

SUMMARY OF THE INVENTION

To efficiently transmit data on a wireless network, small packets that might otherwise be sent individually (e.g. on the order of 188 bytes) are aggregated into a "superframe". This superframe can then be transmitted as a single, larger packet.

To form this superframe, a plurality of data packets can be aggregated into a packet aggregation block (PAB). Encapsulation data can be appended to the PAB. Wireless transmission information can bound the PAB and encapsulation data, thereby creating a superframe transmittable in a wireless network. The wireless transmission information can include a media access control (MAC) header, an integrity check value (ICV), and a frame check sequence (FCS).

The encapsulation data for the PAB can include protocol information relating to the transport mechanism. For example, software-defined encapsulation data could include data regarding the Internet protocol (IP), the transmission control protocol (TCP), the user datagram protocol (UDP), or the IEEE 802.3 standard. In one embodiment, each data packet includes corresponding encapsulation data at a predetermined level and the encapsulation data for the PAB is at another predetermined level. Therefore, in this embodiment, one or more of the data packets and the PAB may have different protocol information.

A tagged data packet (TDP) can be formed by appending the following information: a length value of a data portion of the TDP, data fragmentation and type indication data of the TDP, error code data of the TDP, timestamp data of the TDP, and raw packet data of the TDP. In one embodiment, forming each TDP can further include appending word alignment padding of the TDP.

Forming the superframes can be performed using an efficient combination of hardware and software. For example, in one embodiment, aggregation of the tagged data packets can be performed by hardware without regard to the underlying protocol(s). Exemplary hardware suitable for data aggregation could include state machines and direct memory access (DMA) engines. Software can then provide protocol-handling support.

DETAILED DESCRIPTION OF THE FIGURES

In a wireless network, the rapidly increasing number of transmitted packets can create significant overhead. Protocols to avoid packet collisions can add to this overhead. In accordance with one aspect of the invention, small packets (e.g. on the order of 188 bytes) that might otherwise be sent individually are aggregated into a "superframe". This superframe can then be transmitted as a single, larger packet, thereby advantageously reducing overhead.

Figure 1:
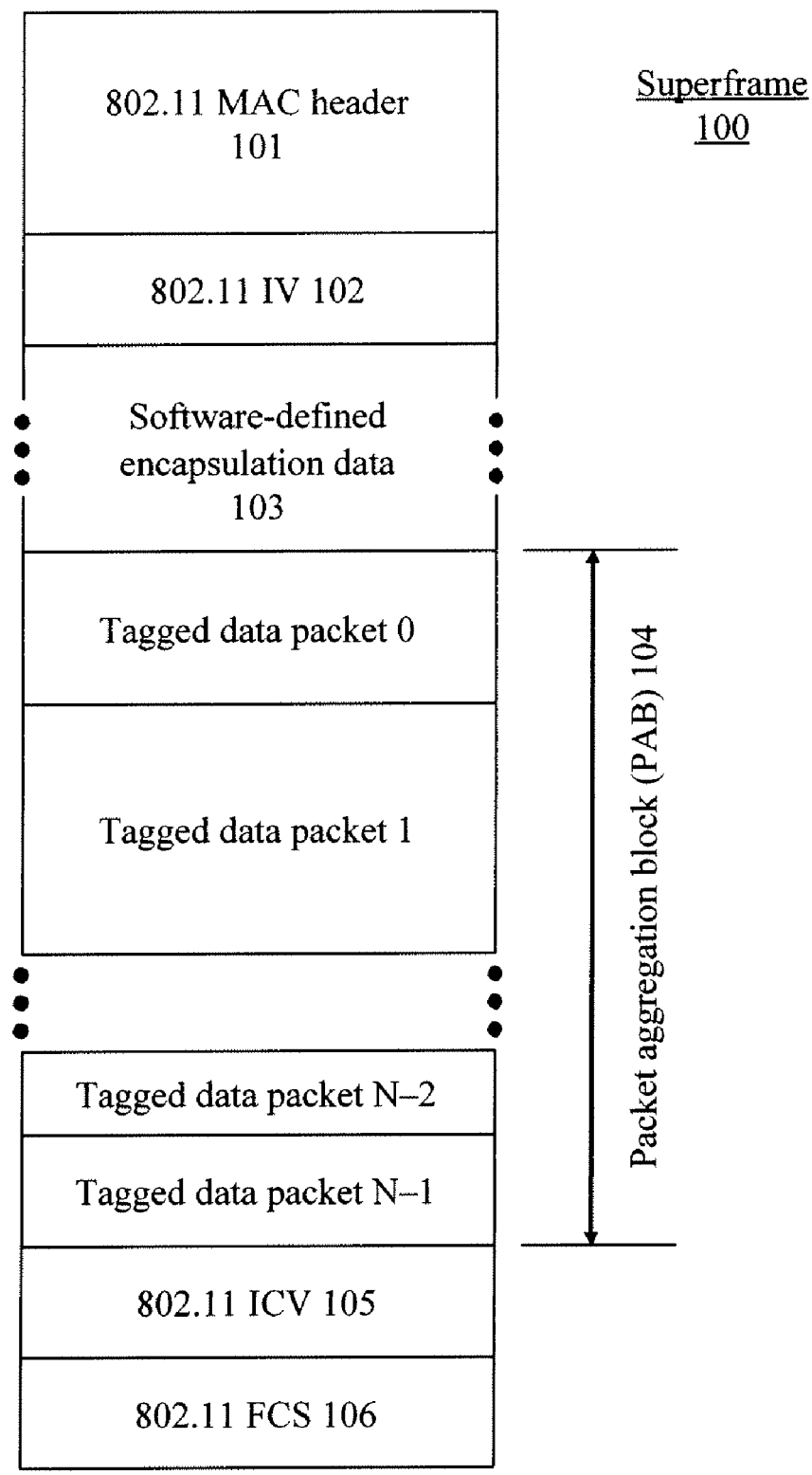
FIG. 1 illustrates an exemplary superframe including a plurality of tagged data packets.

FIG. 1 illustrates an exemplary superframe 100. Superframe 100 includes a packet aggregation block (PAB) 104 that comprises N tagged data packets (i.e. 0, 1, 2 . . . N-1). In one embodiment, hardware can form the packet aggregation block (PAB) 104 of a superframe whereas software can form the remainder of the superframe. The remainder of the superframe can include various blocks for storing information related to wireless transmission functions.

For example, superframe 100 can include an 802.11 MAC header 101. The 802.11 standard specifies a common medium access control (MAC) layer, which provides a variety of functions that support the operation of 802.11-based wireless local area networks (WLANs). In general, the MAC layer manages and maintains communications between 802.11 stations by coordinating their access to and facilitating communications over the wireless medium, i.e. a radio channel. The 802.11 MAC header 101 includes a 6-byte destination address (e.g. a single recipient node, a group of recipient nodes, or the set of all recipient nodes), a 6-byte source address (e.g. the node address of the transmitting station), and a 2-byte type field (e.g. a Service Access Point (SAP) to identify the type of protocol being carried).

Superframe 100 can further include an initialization vector (IV) 102 for data security. Many network interface cards (NICs) and access point providers support WEP (wired equivalent privacy), which is implemented in the MAC layer as directed by the 802.11 standard. If the transmitting station activates WEP, then the superframe is encrypted before transmission. The receiving station performs decryption after receiving the superframe.

As part of the encryption process, WEP generates an encryption seed by concatenating a secret key supplied by the transmitting station with a random-generated 24-bit initialization vector (IV). WEP inputs the encryption seed into a pseudo-random number generator that generates a keystream equal to the length of the frame's payload plus a 32-bit integrity check value (ICV) 105.

The ICV 105 is a check sum that the receiving station can recalculate and compare to the one sent by the transmitting station to determine whether the transmitted data was tampered with in transit. Specifically, if the receiving station calculates an ICV that doesn't match the one found in the superframe, then the receiving station can reject the superframe or generate a flag.

The receiving station can use the 802.11 initialization vector 102 along with the secret key (previously supplied by the transmitting station) to decrypt the transmitted superframe. The 802.11 initialization vector 102 can advantageously lengthen the life of the secret key because the transmitting station can change the initialization vector for each transmitted frame.

Superframe 100 can further include software-defined encapsulation data 103. This software-defined encapsulation data could include protocol information relating to the transport mechanism. For example, software-defined encapsulation data 103 could include data regarding IP (i.e. the Internet protocol, which specifies the format of packets and the addressing of those packets), TCP (i.e. the transmission control protocol, which establishes the connection between the stations and ensures that packets will be delivered in the order sent), UDP (i.e. the user datagram protocol, which can efficiently send and receive packets over a network, albeit with few error recovery services), or the IEEE 802.3 standard (i.e. the standard defining the Ethernet, a widely implemented LAN).

Superframe 100 can further include 802.11 frame check sequence (FCS) 106. In one embodiment, the FCS 106 can include a cyclic redundancy check (CRC) for error detection.

Figure 2:
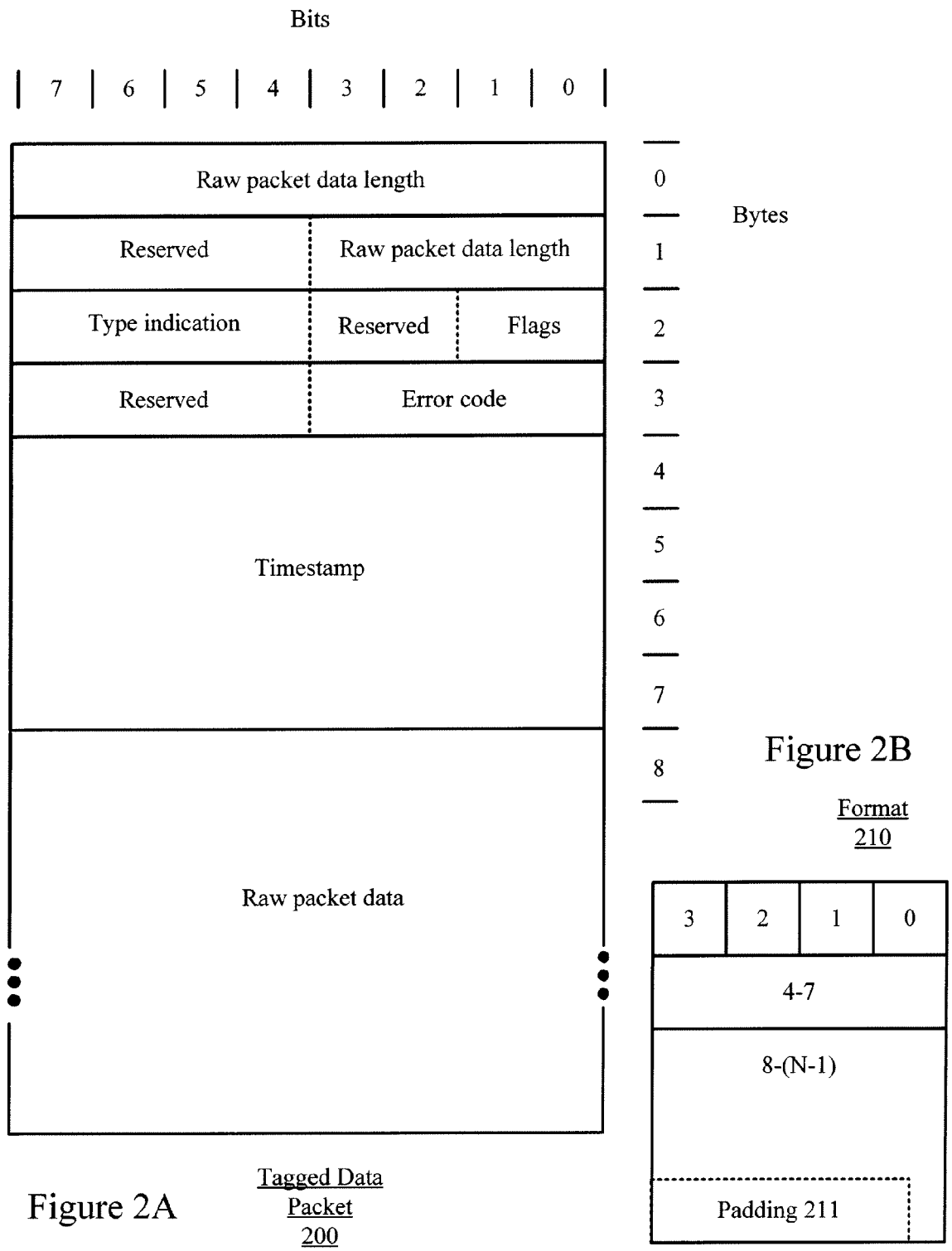
FIG. 2A illustrates an exemplary tagged data packet.
FIG. 2B illustrates an exemplary format for a tagged data packet.

In one embodiment, packet aggregation block (PAB) 104 comprises an ordered sequence of tagged data packets, wherein each tagged data packet can include raw data as received from an input interface (e.g. an MPEG-TS packet) preceded by status (tag) information describing various characteristics of the data packet. FIG. 2A shows a tagged data packet 200, for simplicity of illustration, having a width of 8 bits (i.e. a byte). FIG. 2B illustrates an exemplary format 210 for tagged data packet 200 having a width of 32 bits. The reference numerals used in format 210 correspond to the bytes of tagged data packet 200.

Table 1, shown below, indicates the function of the bits of each byte. A description of these bits now follows. In this embodiment, bytes 0 and 1 can indicate the length of the raw data (Ld) in the packet (referring to FIG. 2B). Note that this value excludes the length of bytes 0-7 as well as any word-alignment padding (described below). In one embodiment, bits [7:0] of byte 0 can store the least-significant eight bits of the length Ld, whereas bits [3:0] of byte 1 can store the most-significant four bits of the length Ld. Bits [7:4] of byte 1 can be reserved.

Bits [1:0] of byte 2 can indicate data block fragmentation. Note that the external source of data may have already divided up a large data block into multiple data blocks. Therefore, these bits can serve as "flags" to alert the receiving station to this fragmentation. For example, "00" could indicate that the tagged data packet includes an entire, unfragmented data block, "01" could indicate that the tagged data packet includes an initial portion (i.e. a start) of a fragmented data block, "10" could indicate that the tagged data packet includes a continuation (i.e. a middle) of a fragmented data block, and "11" could indicate that the tagged data packet includes a final portion (i.e. an end) of a fragmented data block. Bits [3:2] of byte 2 can be reserved.

Bits [7:4] of byte 2 can indicate the value of "type" signals from an MPEG-TS bus (i.e. a transport stream buscompatible with the ISO/IEC 13818-1:2000 Specification that defines, in part, an MPEG-2 system standard, including Transport Stream (TS) encoding) that accompanied the first byte of the packet. These type signals can indicate the transaction currently on the bus. In one embodiment, one transaction could be for video and another transaction could be for audio.

Bits [7:0] of bytes 4-7 can reflect the local time, in microseconds, at which the first byte of the packet was transferred from an external source to the packet aggregation block (i.e. to the transmit side of the wireless link). In one embodiment, byte 4 can store the least-significant 8 bits of the timestamp whereas byte 7 can store the most-significant 8 bits of the timestamp. A receiving station can advantageously use the timestamp for each tagged data packet to reassemble the data packets in chronological order.

Bits [7:0] of bytes 8 to the end of the tagged data packet, which is Ld+7 in this embodiment, can store the raw packet data. In the embodiment shown in FIG. 2B, if the raw packet data length (Ld) is not a multiple of 4 bytes, then padding bytes 211 can be appended to the end of the raw packet data such that each tagged data packet has a total length that is a multiple of 4 bytes. Note that this padding is described by "(8+Ld)–(7+Ld+(Ld %4) ? 4–(Ld %4): 0)" in Table 1, which translates to "bytes denoted by the sum of 8 plus the data length through bytes denoted by the sum of 7 plus the data length plus, if the remainder of data length divided by 4 is non-zero, the quantity 4 minus the non-zero remainder, else zero". Note that this descriptive syntax is consistent with mathematic operator and conditional symbology used in the "IC" programming language.

Two examples are provided to clarify how this padding function is performed. In a first example, assume that Ld=1, i.e. the raw packet data extends from byte 8 through 8 (one byte). Thus, the padding for this raw packet data can extend from bytes (8+1)=9 through (7+1+(4−1))=11. Therefore, a three byte padding entry is needed to make the total number of bytes a multiple of 4.

In a second example, assume that Ld=15, i.e. the raw packet data extends from byte 8 through 22 (15 bytes). Thus, the padding for this raw packet data can extend from bytes (8+15)=23 through (7+15+(4−3))=23. Therefore, one byte padding entry is needed to make the total number of bytes a multiple of 4.

TABLE 1

Tagged data packet (TDP) format

| Byte | Bits | Description |
| --- | --- | --- |
| 0 | 7:0 | Length of raw data of TDP, in bytes |
| 1 | 3:0 | |
| 1 | 7:4 | Reserved |
| 2 | 1:0 | Data block fragmentation indication |
| 2 | 3:2 | Reserved |
| 2 | 7:4 | Type indication |
| 3 | 3:0 | Error code |
| 3 | 7:4 | Reserved |
| 4-7 | 7:0 | Timestamp |
| 8 – (7 + Ld) | 7:0 | Raw packet data |
| (8 + Ld) – (7 + Ld + (Ld %4) ? 4- (Ld %4):0) | 7:0 | Word alignment padding |

Figure 3:
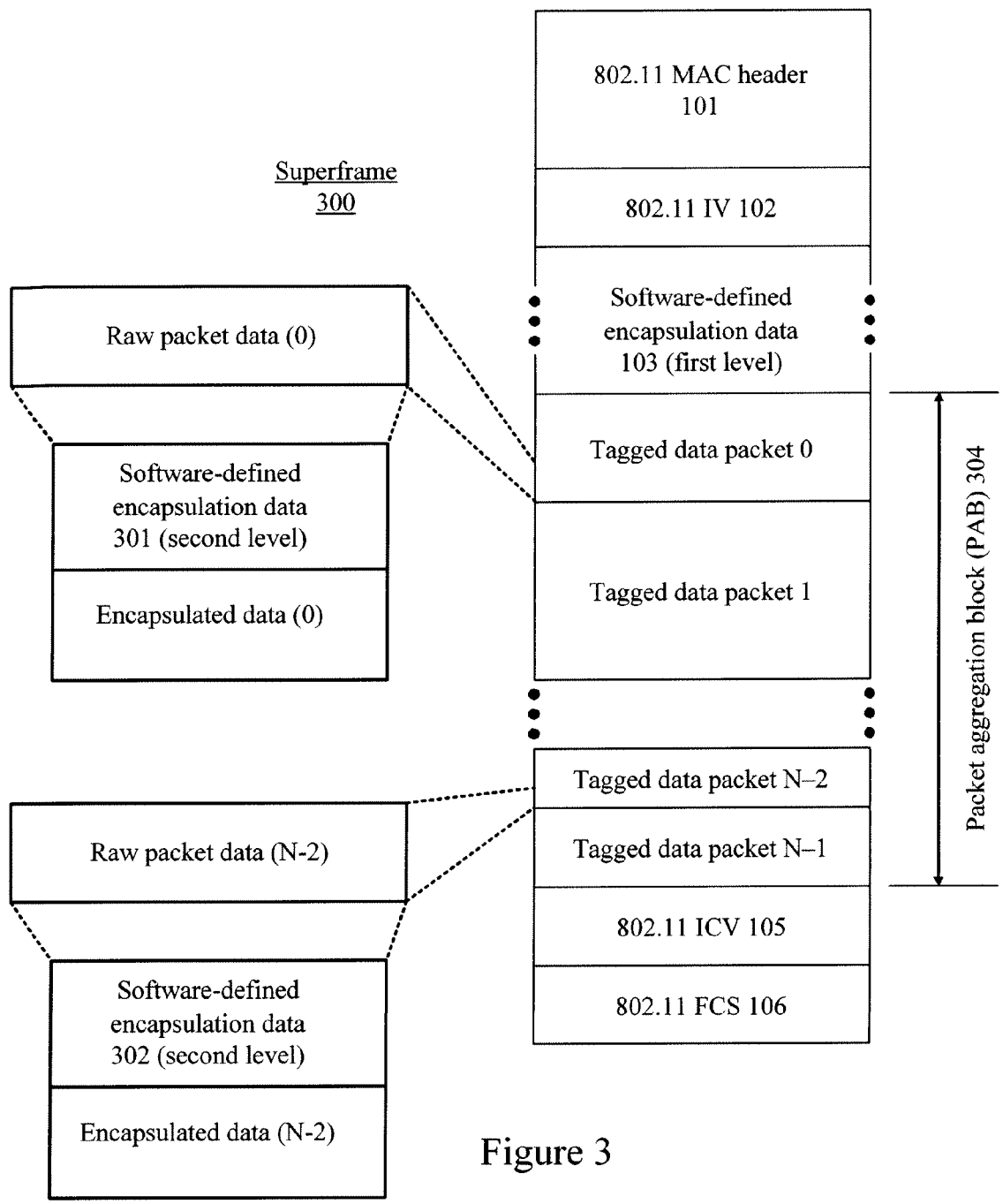
FIG. 3 illustrates an exemplary superframe including a plurality of tagged data packets having multiple protocols and/or destinations.

FIG. 3 illustrates another embodiment of a superframe 300 having a plurality of tagged data packets having different protocols. Specifically, in superframe 300, the raw packet data of each tagged data packet further includes its own software-defined encapsulation data. For example, the raw packet data (0) of tagged data packet 0 includes software-defined encapsulation data 301 and encapsulated data (0) whereas the raw packet data (N-2) of tagged data packet N-2 includes software-defined encapsulation data 302 and encapsulated data (N-2)(the software-defined encapsulation data and the encapsulated data for other tagged data packets are not shown for simplicity). Notably, software-defined encapsulation data 301 can be different from software-defined encapsulation data 302.

In one embodiment, the software-defined encapsulation data 301 and 302 could refer to different protocols, one or both of which could be different than software-defined encapsulation data 103. Note that these different levels of encapsulation data facilitate aggregation of the tagged data packets using hardware without regard to the underlying protocol(s). Exemplary hardware suitable for data aggregation could include state machines and direct memory access (DMA) engines. Software can then provide protocol-handling support. Note that in addition to or in lieu of different protocols, the additional level(s) of software-defined encapsulation data can include any software-defined data that may distinguish various data packets.

Note that although first and second levels of encapsulation data are shown, any number of levels could be provided within packet aggregation block 304. For example, each tagged data packet shown in FIG. 3 could include multiple data packets. Therefore, such a configuration would have three levels of encapsulation data.

Notably, for each transition to the next higher level, another encapsulation data level is provided for optimal flexibility in data packet aggregation. Thus, for example, because the tagged data packets within packet aggregation block 304 have a second level of encapsulation data, a first level of encapsulation data must be provided for packet aggregation block 304 itself. This first level of encapsulation data can then be bounded by 802.11 information (e.g. at least 802.11 MAC header 101, 802.11 ICV 105, and 802.11 FCS 106) to facilitate wireless transmission.

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

The invention claimed is:

1. A method of generating a superframe for transmission in a wireless network, the method comprising:
   generating a packet aggregation block (PAB) by aggregating tagged data packets using hardware without regard to any underlying protocol of the tagged data packets, each tagged data packet including predetermined bits for indicating data block fragmentation;
   encapsulating the PAB using transport type encapsulation data, which identifies a protocol, to create the superframe, the protocol being one of an Internet protocol, a transmission control protocol, a user datagram protocol, and an IEEE 802.3 standard; and
   submitting the superframe for transmission in the wireless network.

2. The method of claim 1, wherein each tagged data packet includes corresponding transport type encapsulation data at a predetermined level and the transport type encapsulation data for the PAB is at another predetermined level.

3. A method of generating a superframe for transmission in a wireless network, the method comprising:
   generating a packet aggregation block (PAB) by aggregating tagged data packets, each tagged data packet including transport type encapsulation data at a predetermined level, the transport type encapsulation data including identification of a protocol, the protocol being one of an Internet protocol, a transmission control protocol, a user datagram protocol, and an IEEE 802.3 standard, each tagged data packet including predetermined bits for indicating data block fragmentation;
   encapsulating the PAB using transport type encapsulation data at another predetermined level to create the superframe; and
   submitting the superframe for transmission in the wireless network.

4. The method of claim 3, wherein generating the PAB is performed by hardware.

5. The method of claim 4, wherein the hardware includes a state machine.

6. The method of claim 4, wherein the hardware includes a direct memory access (DMA) engine.

7. The method of claim 4, wherein the predetermined bits indicate whether data in the tagged data packet is unfragmented, for an initial portion of a fragmented data block, for a middle portion of a fragmented data block, or for a final portion of a fragmented data block.

8. A method of generating a superframe for transmission in a wireless network, the method comprising:
   generating a packet aggregation block (PAB) by aggregating tagged data packets using hardware without regard to any underlying protocol of the tagged data packets, each tagged data packet including predetermined bits for indicating a timestamp;
   encapsulating the PAB using transport type encapsulation data, which identifies a protocol, to create the superframe, the protocol being one of an Internet protocol, a transmission control protocol, a user datagram protocol, and an IEEE 802.3 standard; and
   submitting the superframe for transmission in the wireless network.

9. The method of claim 8, wherein each tagged data packet includes corresponding transport type encapsulation data at a predetermined level and the transport type encapsulation data for the PAB is at another predetermined level.

10. A method of generating a superframe for transmission in a wireless network, the method comprising:
   generating a packet aggregation block (PAB) by aggregating tagged data packets, each tagged data packet including transport type encapsulation data at a predetermined level, the transport type encapsulation data including identification of a protocol, the protocol being one of an Internet protocol, a transmission control protocol, a user datagram protocol, and an IEEE 802.3 standard, each tagged data packet including predetermined bits for indicating a timestamp;
   encapsulating the PAB using transport type encapsulation data at another predetermined level to create the superframe; and
   submitting the superframe for transmission in the wireless network.

11. The method of claim 10, wherein generating the PAB is performed by hardware.

12. The method of claim 11, wherein the hardware includes a state machine.

13. The method of claim 11, wherein the hardware includes a direct memory access (DMA) engine.

14. A method of generating a superframe for transmission in a wireless network, the method comprising:
generating a packet aggregation block (PAB) by aggregating tagged data packets using hardware without regard to any underlying protocol of the tagged data packets, each tagged data packet including predetermined bits for indicating a signal type from an MPEG-TS bus;
encapsulating the PAB using transport type encapsulation data, which identifies a protocol, to create the superframe, the protocol being one of an Internet protocol, a transmission control protocol, a user datagram protocol, and an IEEE 802.3 standard; and
submitting the superframe for transmission in the wireless network.

15. The method of claim 14, wherein each tagged data packet includes corresponding transport type encapsulation data at a predetermined level and the transport type encapsulation data for the PAB is at another predetermined level.

16. A method of generating a superframe for transmission in a wireless network, the method comprising:
generating a packet aggregation block (PAB) by aggregating tagged data packets, each tagged data packet including transport type encapsulation data at a predetermined level, the transport type encapsulation data including identification of a protocol, the protocol being one of an Internet protocol, a transmission control protocol, a user datagram protocol, and an IEEE 802.3 standard, each tagged data packet including predetermined bits for indicating a signal type from an MPEG-TS bus;
encapsulating the PAB using transport type encapsulation data at another predetermined level to create the superframe; and
submitting the superframe for transmission in the wireless network.

17. The method of claim 16, wherein generating the PAB is performed by hardware.

18. The method of claim 17, wherein the hardware includes a state machine.

19. The method of claim 17, wherein the hardware includes a direct memory access (DMA) engine.

* * * * *